(12) United States Patent
Hayashi et al.

(10) Patent No.: US 7,754,099 B2
(45) Date of Patent: Jul. 13, 2010

(54) REDUCING WATER PURIFICATION MATERIAL, METHOD FOR PRODUCING REDUCING WATER PURIFICATION MATERIAL, METHOD FOR TREATING WASTEWATER, AND WASTEWATER TREATMENT APPARATUS

(75) Inventors: Hiroshi Hayashi, Saitama (JP); Hitoshi Takeuchi, Saitama (JP); Hajime Negishi, Saitama (JP); Shigeyuki Tsuzaki, Kitamoto (JP); Yoshio Aikawa, Kasukabe (JP); Ayako Mimoto, Saitama (JP); Shintaro Nakaya, Iwaki (JP)

(73) Assignee: Mitsubishi Materials Corporation, Tokyo (JP)

( * ) Notice: Subject to any disclaimer, the term of this patent is extended or adjusted under 35 U.S.C. 154(b) by 696 days.

(21) Appl. No.: 10/598,494

(22) PCT Filed: Apr. 25, 2005

(86) PCT No.: PCT/JP2005/008334

§ 371 (c)(1),
(2), (4) Date: Dec. 6, 2006

(87) PCT Pub. No.: WO2005/102942

PCT Pub. Date: Jun. 3, 2005

(65) Prior Publication Data

US 2007/0209989 A1 Sep. 13, 2007

(30) Foreign Application Priority Data

| Apr. 26, 2004 | (JP) | 2004-130305 |
| Aug. 31, 2004 | (JP) | 2004-251762 |
| Sep. 10, 2004 | (JP) | 2004-263736 |
| Dec. 27, 2004 | (JP) | 2004-376581 |
| Dec. 27, 2004 | (JP) | 2004-376582 |

(51) Int. Cl.
*C02F 1/62* (2006.01)

(52) U.S. Cl. .............. 252/175; 210/716; 252/188.1; 423/140; 423/594.1; 423/633

(58) Field of Classification Search ............ 252/175
See application file for complete search history.

(56) References Cited

U.S. PATENT DOCUMENTS 3,697,420 A 10/1972 Blaisdell et al.

(Continued)

FOREIGN PATENT DOCUMENTS

DE 196 39 444 A1 4/1997

(Continued)

OTHER PUBLICATIONS

Japanese Office Action dated Nov. 21, 2006 issued for corresponding Japanese Patent Application No. 2005-262733.

(Continued)

*Primary Examiner*—Peter A Hruskoci
(74) *Attorney, Agent, or Firm*—Leason Ellis LLP.

(57) ABSTRACT

A reducing water purification material having a reducing iron-based precipitate selected from green rust, iron ferrite, reducing iron hydroxide, and a mixture thereof. A wastewater treatment process having steps of adding a reducing iron compound to wastewater, leading the wastewater to which the reducing iron compound is added to a reaction tank and forming a precipitate, separating the formed precipitate by a solid-liquid separation to obtain a sludge, and alkalinizing all or a portion of the separated sludge to form an alkaline sludge followed by returning to the reaction tank, wherein in the precipitation step, the wastewater to which the reducing iron compound is added and the alkaline sludge are mixed and are allowed to react in a non-oxidizing atmosphere under alkaline condition to form a reducing iron compound precipitate as the precipitate, thereby incorporating contaminants in the precipitate to remove the contaminants from the wastewater.

8 Claims, 5 Drawing Sheets

U.S. PATENT DOCUMENTS

| | | | |
|---|---|---|---|
| 4,169,053 | A | 9/1979 | Sakakibara et al. |
| 4,566,975 | A | 1/1986 | Allgulin |
| 4,724,084 | A | 2/1988 | Pahmeier et al. |
| 5,039,428 | A * | 8/1991 | Wentzler et al. ............ 210/711 |
| 5,505,857 | A * | 4/1996 | Misra et al. ................ 210/709 |
| 5,545,331 | A | 8/1996 | Guess |
| 5,685,993 | A | 11/1997 | Liu |
| 5,954,969 | A | 9/1999 | Hedin |
| 6,139,753 | A | 10/2000 | Taylor et al. |
| 6,582,605 | B2 | 6/2003 | Krulik et al. |
| 6,596,182 | B1 * | 7/2003 | Prenger et al. ............. 210/798 |
| 6,896,815 | B2 | 5/2005 | Cort |
| 7,220,360 | B2 * | 5/2007 | Chen et al. ................ 210/709 |

FOREIGN PATENT DOCUMENTS

| | | |
|---|---|---|
| JP | 2004-883 | 1/1990 |
| JP | 3-137987 | 6/1991 |
| JP | 8-229571 | 9/1996 |
| JP | 10-249362 | 9/1998 |
| JP | 2000-246270 | 9/2000 |
| JP | 2001-79565 | 3/2001 |
| JP | 2001-121140 | 5/2001 |
| JP | 2001-179266 | 7/2001 |
| JP | 2002-102863 | 4/2002 |
| JP | 2006-95519 | 4/2006 |
| JP | 2006/263699 | 10/2006 |
| KR | 20030023153 A | 3/2003 |
| WO | WO-2004/002901 A1 | 1/2004 |
| WO | 2005/102942 | 11/2005 |

OTHER PUBLICATIONS

Patent Abstracts of Japan for JP09-262592 published Oct. 7, 1997.
Patent Abstracts of Japan for JP08-267076 published Oct. 15, 1996.
Patent Abstracts of Japan for JP2002-326090 published Nov. 12, 2002.
Patent Abstracts of Japan for JP2001-009467 published Jan. 16, 2001.
Patent Abstracts of Japan for JP2001-321781 published Nov. 20, 2001.
Patent Abstracts of Japan for JP05-057292 published Mar. 9, 1993.
Patent Abstracts of Japan for JP2000-117142 published Apr. 25, 2000.
Patent Abstracts of Japan for JP2001-259657 published Sep. 25, 2001.
Front Page of U.S. Patent No. 4,465,597 corresponding to JP61-156 published Jan. 6, 1986.
Philippe Refait et al., Reduction of $SeO_{42}^-$ Anions and Anoxic Formation of Iron(II)-Iron(III) Hydroxy-Selenate Green Rust, Environ Sci. Technol. 2000, vol. 34, No. 5, pp. 819-825.
U. Schwertmann, et al., The Formation of Green Rust and Its Transformation to Lepidocrocite, Clay Minerals, Mar. 1994, vol. 29, No. 1, pp. 87-92.
Yutaka Tamura, Ferrite Formation from the Intermediate, Green Rust II, in the Transformation Reaction of gamma-FeO(OH) in Aqeous Suspension, Inorg. Chem., vol. 24, 1985, pp. 4363-4366.
S.C.B. Myneni, et al., Abiotic Selenium Redox Transformations in the Presence of Fe(II, III) Oxides, Science, vol. 278, No. 5340, Nov. 7, 1997, pp. 1106-1109.
Pepper, Sarah E., et al, "Treatment of Radioactive Wastes: An X-Ray Absorption Spectroscopy Study of the Reaction of Technetium with Green Rust." Journal of Colloid and Interface Science, 2003, vol. 268, No. 2, p. 408-412.
Patent Abstracts of Japan for JP 2002-102863 published Apr. 9, 2002.
Patent Abstracts of Japan for JP 03-137987 published Jun. 12, 1991.
Patent Abstracts of Japan for JP 2001-079565 published Mar. 27, 2001.
Patent Abstracts of Japan for JP 08-229571 published Sep. 10, 1996.
Patent Abstracts of Japan for JP 2000-246270 published Sep. 12, 2000.
Patent Abstracts of Japan for JP 2001-179266 published Jul. 3, 2001.
Patent Abstracts of Japan for JP 10-249362 published Sep. 22, 1998.
Patent Abstracts of Japan for JP 2004-000883 published Jan. 1, 2004.
Patent Abstracts of Japan for JP 2001-121140 published May 8, 2001.
Japanese Office Action dated Aug. 1, 2006 isued for corresponding Japanese Patent Application No. 2005-262733.
English translation of Japanese Office Action dated Aug. 1, 2006 Isued for corresponding Japanese Patent Application No. 2005-262733.
Japanese Office Action dated Sep. 26, 2006 issued for corresponding Japanese Patent Application No. 2005-125726.
English translastion of Japanese Office Action dated Sep. 26, 2006 issued for corresponding Japanese Patent Application No. 2005-125726.

* cited by examiner

REDUCING WATER PURIFICATION MATERIAL, METHOD FOR PRODUCING REDUCING WATER PURIFICATION MATERIAL, METHOD FOR TREATING WASTEWATER, AND WASTEWATER TREATMENT APPARATUS

CROSS-REFERENCE TO PRIOR APPLICATIONS

This is a U.S. national phase application under 35 U.S.C. §371 of International Patent Application No. PCT/JP2005/008334 filed Apr. 25, 2005, and claims the benefit of Japanese Application No. 2004-130305, filed Apr. 26, 2004; Japanese Application No. 2004-251762, filed Aug. 31, 2004; Japanese Application No. 2004-263736, filed Sep. 10, 2004; Japanese Application No. 2004-376581 filed Dec. 27, 2004 and Japanese Application No. 2004-376582, filed Dec. 27, 2004. The International Application was published in English on Nov. 3, 2005 as International Publication No. WO 2005/102942 A1 under PCT Article 21(2).

TECHNICAL FIELD

The present invention relates to a water purification material having superior removal effects on heavy metals contained in wastewater and superior economy. More particularly, the present invention relates to a water purification material that can be used at normal temperatures, effectively removes heavy metals contained in wastewater and has superior economy, and to a production process thereof.

Moreover, the present invention relates to a purification treatment system that efficiently removes contaminants from wastewater containing contaminants, and has superior economy. More particularly, the present invention relates to a wastewater treatment process and treatment apparatus that constitute a purification treatment system that uses a reducing iron compound precipitate in the same manner as the aforementioned water purification material, having a simple process, superior practicality and superior economy for efficiently removing contaminants contained in wastewater at normal temperatures.

Priority is claimed to Japanese Patent Application No. 2004-130305, filed on Apr. 26, 2004, Japanese Patent Application No. 2004-251762, filed on Aug. 31, 2004, Japanese Patent Application No. 2004-263736, filed on Sep. 10, 2004, Japanese Patent Application No. 2004-376581, filed on Dec. 27, 2004, and Japanese Patent Application No. 2004-376582, filed on Dec. 27, 2004, the contents of which are incorporated herein by reference.

BACKGROUND ART

A known example of a process of purifying wastewater containing contaminants of the prior art consisted of removing heavy metal ions present in wastewater by reducing those metal ions by adding a reducing agent to the wastewater, and iron powder and so forth was used for the reducing agent.

For example, a process is described in Japanese Unexamined Patent Application, First Publication No. H9-262592 in which a layer packed with iron particles is formed in a column-shaped tank, and wastewater is passed through this iron particle packed layer to remove heavy metals by adsorbing them onto the surface of the iron particles. However, in processes that use iron powder for the reducing agent, since their reducing power decreases rapidly as a result of the surface reaction being impaired when heavy metals are adsorbed onto the surface of the iron particles, it is necessary to replace the iron powder at short intervals, thereby resulting in the problem of a large maintenance burden. Moreover, post-treatment is required under acidic conditions in particular due to the generation of hydrogen gas and divalent iron. In addition, the packed layer becomes extraordinarily heavy due to the use of a large amount of iron powder, thereby placing a large burden on the apparatus structure as well.

In addition, selenium present in wastewater is subjected to strict discharge standards as an environmental contaminant. Normally, selenium is present in wastewater in the form of selenite ions ($SeO_3^{2-}$) (tetravalent selenium) and selenate ions ($SeO_4^{2-}$) (hexavalent selenium). Examples of known processes for removing this selenium include: (i) a process in which a trivalent iron compound such as ferric hydroxide is added to co-precipitate the selenium by adsorbing it to a precipitate by taking advantage of its aggregating action, (ii) a process in which barium or lead and so forth is added to form a refractory selenate precipitate, (iii) a process in which selenium is removed by adsorbing using an ion exchange resin, and (iv) biological treatment processes.

However, since co-precipitation by barium or lead is susceptible to the effects of other ions present, it is necessary to increase the amount added, and a burden is placed on post-treatment since barium and lead are also heavy metals. In addition, processes using an ion exchange resin have the problem of their removal effects decreasing dramatically in the presence of sulfate ions and so forth. Moreover, biological treatment processes have a long treatment time.

On the other hand, processes using trivalent iron compounds have hardly any effects on hexavalent selenium. Therefore, a process has been proposed that uses ferrous salt (divalent iron). This process promotes the precipitation of selenium by reducing hexavalent selenium to tetravalent selenium using the reducing power of ferrous iron.

For example, Japanese Unexamined Patent Application, First Publication No. H08-267076 describes a treatment process in which divalent iron ions are added to selenium-containing wastewater followed by the addition of an alkaline compound in an environment isolated from air while heating and maintaining the liquid temperature to 30° C. or higher to form a selenium precipitate.

Japanese Unexamined Patent Application, First Publication No. 2002-326090 describes a treatment process comprising a first step, in which hydroxides of heavy metals are precipitated by adding an alkaline compound to selenium-containing wastewater, a second step, in which an inert gas is introduced into this treatment liquid to remove dissolved oxygen followed by adding ferrous salt in the alkaline range to reduce and precipitate the selenium, and a third step, in which air is blown into this treatment liquid to precipitate heavy metals remaining in the liquid by incorporating in an iron-containing precipitate.

Japanese Unexamined Patent Application, First Publication No. 2001-9467 describes a treatment process which, on the one hand, forms a selenium-containing precipitate by adding ferrous hydroxide to selenium-containing wastewater and then adding an alkaline compound, while on the other hand, enhances treatment efficiency by circulating a portion of this sludge to a reaction tank following addition of an alkaline compound.

However, it is difficult to lower the selenium concentration in wastewater to 0.01 mg/L or lower with the aforementioned treatment processes of the prior art. In addition, in processes simply involving the addition of ferrous hydroxide, the treatment process is complicated due to the need to preliminarily remove dissolved oxygen in the wastewater since oxygen in the wastewater competes for reaction with ferrous ions with the selenium. Moreover, since precipitates of ferrous hydroxide have a high moisture content and a large apparent density, they place a large burden on slurry treatment if used in that form.

Furthermore, although processes are known in which a portion of the formed precipitate is circulated to a reaction tank, since the consolidating effects of precipitation are still low if the formed precipitate is merely circulated, a burden is placed on post-treatment. Moreover, since many treatment processes of the prior art use iron ferrite by heat-treating ferrous hydroxide, in addition to the treatment process becoming complex, there is also the problem of increased heating costs.

In addition, a treatment process for removing heavy metals from wastewater in which ferrous iron ions and so forth are added to wastewater containing heavy metals, iron ferrite or pseudo-iron ferrite is formed by adjusting the pH to 5 or higher, and the formed ferrite sludge is then separated into solid and liquid together with circulating the sludge by returning a portion to a reaction tank (Japanese Unexamined Patent Application, First Publication No. 2001-321781).

This process focuses on the fact that ferrite sludge ($FeO.Fe_2O_3$) contains ferrous iron and ferric iron, and forms a precipitate by utilizing the fact that the presence of both ferrous iron and ferric iron more easily forms a ferrite sludge than ferrous iron alone. However, since the ferrite sludge of this treatment process has low reducing power, there are limitations on its heavy metal removal effects even if returned to a reaction tank.

On the other hand, in a wastewater treatment process in which a sludge is precipitated by adding an alkaline compound to wastewater containing heavy metals followed by separation of this sludge, the alkaline compound is not added directly to the heavy metal wastewater, but rather is only added to a portion of the separated sludge, after which this alkaline sludge is returned to a reaction tank (Japanese Examined Patent Application, Second Publication No. S61-156, Japanese Unexamined Patent Application, First Publication No. H05-57292 (Japanese Patent No. 2910346)). However, it is difficult for the alkaline sludge alone to lower heavy metal levels to equal to or below environmental standard values.

In addition, magnetic separation means are known as means for efficiently separating heavy metal aggregates or heavy metal precipitates when removing heavy metals contained in wastewater by precipitation or aggregation.

Japanese Unexamined Patent Application, First Publication No. 2000-117142 describes a means that aggregates heavy metal ions in waste liquid, and a separation means that uses a magnetic filter to entrap particles present in a waste liquid by forming a strong magnetic field with a superconducting solenoid magnet.

Japanese Unexamined Patent Application, First Publication No. 2001-321781 described a treatment process in which ferrite sludge is formed by adding ferrous iron ions to heavy metal wastewater followed by separating with a thickener or magnetic separator and so forth.

Japanese Unexamined Patent Application, First Publication No. 2001-259657 describes a treatment process in which magnetite particles and so forth are added to form aggregates having increased magnetism followed by magnetic separation, that is used when aggregating and/or precipitating phosphorous and heavy metals by the aggregation/precipitation and ferrite methods.

However, there are limitations on the magnetic separation effects of magnetic separation employed in the aforementioned treatment processes of the prior art since magnetic fields are applied statically in all of these processes. Since precipitates of heavy metals contained in wastewater are particularly diverse depending on the types and precipitated states of the heavy metals, there is the problem of being unable to obtain adequate separation effects simply by statically applying a fixed magnetic field.

DISCLOSURE OF THE INVENTION

In order to solve the aforementioned problems of wastewater treatment processes of the prior art using iron powder, a first object of the present invention is to provide a water purification material and its production process in which reducing power is maintained for a long period, precipitates are consolidated, there is satisfactory separation of solids and liquids, and superior economic and treatment effects are demonstrated enabling ferrite treatment at normal temperatures.

In order to solve the aforementioned problems by improving on treatment processes based on ferrite processes of the prior art using ferrous salt, a second object of the present invention is to provide a treatment process and treatment apparatus in which precipitates are consolidated, there is satisfactory separation of solids and liquids, superior economic and treatment effects are demonstrated enabling ferrite treatment at normal temperatures, and contaminants present in wastewater are effectively removed by precipitating.

A third object of the present invention is to provide a treatment apparatus that solves the aforementioned problems of the prior art by precipitating heavy metals present in wastewater followed by their filtration and separation. In particular, a treatment apparatus is provided in which precipitation of heavy metals or enhances solid-liquid separation effects are promoted by applying a variable magnetic field to either or both of a reaction tank in which heavy metals are precipitated and a solid-liquid separation tank in which precipitates are separated.

A reducing water purification material of the present invention has a reducing iron-based precipitate selected from green rust, iron ferrite, reducing iron hydroxide, and mixtures thereof.

In this reducing water purification material, a ratio of divalent iron to total iron ($Fe^{2+}$/total Fe) in the aforementioned reducing iron-based precipitate may be 0.3 or more.

The reducing water purification material may have a slurry in which the reducing iron-based precipitate is dispersed in water, an oxidation-reduction potential of the slurry may be −500 mV to −800 mV versus Ag/AgCl electrode, and a pH of the slurry may be 7 to 11.

The reducing water purification material may be used for removing one or more of selenium, copper, hexavalent chromium, molybdenum, boron, antimony, lead, arsenic, zinc, cadmium, nickel, manganese, fluorine, tin, phosphorous, cobalt, and organochlorine compounds of trichloroethylene and dichloroethylene, which are contained in a wastewater.

The reducing water purification material may be used by contacting with wastewater under neutral or alkaline condition.

The reducing water purification material may be used by contacting with wastewater in a non-oxidizing atmosphere.

According to the reducing water purification material of the present invention, heavy metals contained in wastewater are effectively removed from the wastewater by being incorporated in an iron-based precipitate. More specifically, concentration in wastewater of, for example, selenium, cadmium, chromium, lead, zinc, copper, or nickel can be reduced to less than 0.01 mg/L, while concentration in wastewater of arsenic or antimony can be reduced to less than 0.001 mg/L. In addition, in the case of using this reducing water purification material, heating is not required, and conversion of the precipitate to iron ferrite proceeds by incorporating wastewater heavy metals at normal temperatures. Moreover, since consolidated, compact precipitates are formed due to the conversion to iron ferrite, the precipitates can be dewatered easily, thereby reducing the burden placed on post-treatment by the precipitate resulting in superior economy and ease of handling. Here, since the precipitate is mainly including magnetite, it is magnetic and can be treated by adsorbing the separated precipitate on a magnet.

A first aspect of the method for producing the reducing water purification material of the present invention has a step of adding an alkaline compound to an aqueous solution of a ferrous salt to alkalinize at a pH of 7 to 11, thereby forming an iron-based precipitate; a step of separating the iron-based precipitate by a solid-liquid separation and recovering the iron-based precipitate, followed by further adding an alkaline compound to adjust a pH to 11 to 13 to form a strong alkaline iron-based precipitate; a step of adding the strong alkaline precipitate to an aqueous solution of a ferrous salt, followed by adjusting a pH to 7 to 11 and stirring to form a slurry; and a step of separating a formed precipitate in the slurry by a solid-liquid separation to form a concentrated precipitate, wherein a ratio of divalent iron to total iron (Fe$^{2+}$/total Fe) in the slurry is made to be 0.3 or more, and an oxidation-reduction potential of the slurry is made to be −500 mV to −800 mV versus Ag/AgCl electrode, by repeating the separating, adding, and separating steps while adjusting contact surface areas with an air interface.

A second aspect of the method for producing a reducing water purification material of the present invention has a step of aerating water with an inert gas to remove oxygen in the water; a step of adding a ferrous salt and a ferric salt to the water to form an aqueous solution containing Fe$^{2+}$ and Fe$^{3+}$ at a molar ratio Fe$^{2+}$/Fe$^{3+}$ of 2; a step of adding an alkaline compound to the aqueous solution containing Fe$^{2+}$ and Fe$^{3+}$ to adjust a molar ratio of hydroxide ions to total Fe to 2, thereby forming a precipitate; a step of separating the formed precipitate by a solid-liquid separation and recovering the precipitate, followed by further adding an alkaline compound to adjust a pH to 11 to 13 to form a strong alkaline iron-based precipitate; a step of adding the strong alkaline iron-based precipitate to an aqueous solution of a ferrous salt, followed by adjusting a pH to 7 to 11 and stirring to form a slurry; and a step of separating a formed precipitate in the slurry by a solid-liquid separation to form a concentrated precipitate, wherein a ratio of divalent iron to total iron Fe (Fe$^{2+}$/total Fe) in the reducing iron-based precipitate is made to be 0.3 or more, and an oxidation-reduction potential of the slurry is made to be −500 mV to −800 mV versus Ag/AgCl electrode, by carrying out steps E to G in an inert gas atmosphere and repeating the separating, adding and separating steps while adjusting contact surface areas with an air interface.

The method for treating wastewater of the present invention is a method for treating wastewater which removes contaminants from wastewater by adding a reducing iron compound to wastewater containing contaminants to precipitate the contaminants, followed by separating the precipitate by a solid-liquid separation to remove the contaminants from the wastewater, and which has a reducing iron compound addition step of adding a reducing iron compound to wastewater; a precipitation step of leading the wastewater to which the reducing iron compound is added to a reaction tank, and forming a precipitate; a solid-liquid separation step of separating the formed precipitate by a solid-liquid separation to obtain a sludge; and a sludge return step of alkalinizing all or a portion of the separated sludge to form an alkaline sludge, followed by returning to the reaction tank, wherein in the precipitation step, the wastewater to which the reducing iron compound is added and the alkaline sludge are mixed and are allowed to react in a non-oxidizing atmosphere under alkaline condition to form a reducing iron compound precipitate as the precipitate, thereby incorporating contaminants in the precipitate to remove the contaminants from the wastewater.

In the method for treating wastewater of the present invention, the reducing iron compound precipitate formed in the reaction tank may be a mixture of green rust and iron ferrite, and the reducing iron compound precipitate may be formed so that a ratio of bivalent iron ions to total iron ions in the reducing iron compound precipitate (Fe$^{2+}$/Fe(T)) is 0.4 to 0.8.

A pH of the alkaline sludge returned to the reaction tank may be adjusted to 11 to 13, a pH in the reaction tank in which this alkaline sludge is mixed may be adjusted to 8.5 to 11, and the reducing iron compound precipitate is formed in a non-oxidizing atmosphere.

A ferrous iron compound may be used for the reducing iron compound, and the precipitate may be formed in a non-oxidizing atmosphere at a liquid temperature of 10° C. to 30° C. while the reaction tank is sealed.

The method for treating wastewater of the present invention may also have a pretreatment step prior to the reducing iron compound addition step. In the pretreatment step, an iron compound or an aluminum compound is added to the wastewater prior to the iron compound precipitation step to precipitate a hydroxide of iron or aluminum under alkaline condition, thereby at least any one of silicate ions, aluminum ions, and traces of organic compounds is co-precipitated with the hydroxide, followed by the precipitate being removed by filtration, and the reducing iron compound addition step, the precipitation step, the solid-liquid separation step, and the sludge return step may be carried out on the treated wastewater from which the precipitate is removed.

The method for treating wastewater further may also have a step of adding an iron compound or aluminum compound to wastewater containing contaminants, and separating a formed precipitate by a solid-liquid separation, prior to the reducing iron compound addition step, in the reducing iron compound addition step, a ferrous iron compound may be added to the treated wastewater, in the precipitation step, in the reaction tank, the wastewater to which the reducing iron compound is added and the alkaline sludge may be allowed to react at a pH of 8.5 to 11 at a temperature of 10° C. to 30° C. for 30 minutes to 3 hours in the non-oxidizing atmosphere isolated from air, in the sludge return step, an alkaline compound may be added to alkalinizing all or the portion of the separated sludge to adjust a pH of the sludge to 11 to 13, thereby forming the alkaline sludge, and concentrations of the contaminants in the wastewater separated by a solid-liquid separation may be reduced by repeating the precipitation step, the solid-liquid separation step, and the sludge return step.

with respect to the sludge which is separated in the solid-liquid separation step, a sludge which is not returned to the reaction tank may be filtered and dewatered, and a filtrate may be discharged to an outside, alternatively other wastewater may be passed through a residue to separate contaminants in the other wastewater by utilizing a reducing power remaining in the residue.

According to the method for treating wastewater of the present invention, a concentration of each heavy metal of selenium, cadmium, hexavalent chromium, lead, zinc, copper, nickel, arsenic, or antimony in the wastewater can be reduced to 0.01 mg/L or less.

Here, the above-mentioned wastewater may be any water which includes contaminants in a wide range of water types, such as groundwater, industrial waste water, river water, or swamp water.

The wastewater treatment apparatus of the present invention has a tank in which a ferrous iron compound is added to wastewater; a sealed reaction tank having a non-oxidizing atmosphere for allowing the wastewater to which the ferrous iron compound is added to react; a solid-liquid separation means for subjecting a slurry which is extracted from the reaction tank to a solid-liquid separation to obtain a sludge; a tank in which an alkaline compound is added to the separated sludge to form an alkaline sludge; a line through which the alkaline sludge is returned to the reaction tank; and lines which connect each of the tanks and the solid-liquid separation means, and a treatment system relating to the method for treating wastewater of the present invention is formed.

This wastewater treatment apparatus may also have a tank in which an iron compound or aluminum compound is added to the wastewater to form a precipitate, and a solid-liquid separation means to separate the formed precipitate by a solid-liquid separation, prior to the tank in which the reducing iron compound is added to the wastewater.

This treatment apparatus may also have a means for applying a variable magnetic field to either or both of the reaction tank and the solid-liquid separation means, and a magnetic field is fluctuated to precipitate heavy metals or to separate heavy metal precipitate.

The solid-liquid separation means may have a solid-liquid separation tank, and magnets may be arranged on either or both of a periphery of the reaction tank and a partition of the solid-liquid separation tank, and the magnets are rotated or vibrated to fluctuate the magnetic field.

A plurality of reaction tanks may be arranged in series, and a means may be provided for applying a variable magnetic field to either or both of one or more of the reaction tanks and the solid-liquid separation means.

DETAILED DESCRIPTION OF THE INVENTION

The following provides an explanation of preferable embodiments of the present invention with reference to the drawings. The present invention is not limited to the following embodiments, and for example, constituent features of these embodiments may be suitably combined.

The water purification material of the present invention is a reducing water purification material having a reducing iron-based precipitate including green rust, iron ferrite, or a reducing iron hydroxide, or a mixture of two or three thereof, and preferably is a reducing water purification material including a reducing iron-based precipitate in which the ratio of divalent iron to total iron ($Fe^{2+}$/total Fe) is 0.3 or more.

Green rust is a bluish-green substance in which hydroxides of ferrous iron and ferric iron form layers, has a structure in which anions are incorporated between the layers, and is represented by, for example, the following formula (1).

$$[Fe^{II}_{(6-x)}Fe^{III}_{x}(OH)_{12}]^{x+}[A_{x/n}\cdot yH_2O]^{x-} \quad (1)$$

(0.9<x<4.2, $Fe^{2+}$/Total Fe=0.3 to 0.85)
(A: anion such as $SO_4^{2-}$ or $Cl^-$)

For example, this green rust is referred to as green rust (II) (GR(II)) when A=$SO_4^{2-}$ and x=2. Green rust is converted to iron ferrite by mild oxidation.

Although iron ferrite includes mainly magnetite ($Fe^{II}OFe^{III}_2O_3$), a portion of the Fe (II) or Fe (III) may be substituted with heavy metals. The reducing iron-based precipitate of the present invention can be that in which heavy metal ions present in wastewater have been incorporated into green rust and then converted to iron ferrite while containing heavy metals in a portion thereof.

A reducing iron hydroxide is a precipitate which includes mainly an iron (II) hydroxide of divalent iron, and can be obtained by, for example, adding an alkaline compound to an aqueous ferrous salt solution in a non-oxidizing atmosphere to form a precipitate. This iron (II) hydroxide gradually decomposes to green rust due to mild oxidation under neutral or alkaline condition.

Iron-based precipitates are used in which the ratio of divalent iron to total iron ($Fe^{2+}$/total iron) in the precipitate is at least 0.3 or more so as to have reducing power. In the case in which the ratio of divalent iron of the iron-based precipitate is lower than this, reducing power is weak making this unsuitable. Incidentally, as was previously mentioned, the aforementioned ratio of divalent iron ($Fe^{2+}$/total iron) in green rust or a mixture of green rust and iron ferrite is 0.3 to 0.85, and reducing power increases the higher the amount of divalent iron. Furthermore, since green rust is converted to iron ferrite by mild oxidation, the aforementioned ratio of divalent iron should normally be 0.4 to 0.65, and preferably 0.5 to 0.6.

This water purification material has the aforementioned iron-based precipitate. The oxidation-reduction potential of a slurry in which this precipitate is dispersed in water is preferably –500 mV to –800 mV versus Ag/AgCl electrode, and more preferably –620 mV to –680 mV. In addition, the pH of the slurry is preferably 7 to 11, and more preferably 9 to 10. In the case in which the oxidation-reduction potential is higher than the aforementioned range, reduction capacity decreases thereby preventing removal treatment of heavy metals. In addition, if the pH is lower than the aforementioned range, divalent iron ions elute causing poor water quality. On the other hand, if the pH is higher than the aforementioned range, reduction capacity decreases.

This water purification material can be produced in the manner described below.

(A) An alkaline compound such as calcium hydroxide is added to an aqueous ferrous salt solution such as aqueous ferrous sulfate solution followed by adjusting to an alkaline pH of 7 to 11 to form an iron-based precipitate.

(B) This precipitate is recovered by liquid-solid separation after which an alkaline compound such as calcium hydroxide is again added to adjust to a strongly alkaline pH of 11 to 13.

(C) This strongly alkaline precipitate is added to an aqueous ferrous salt solution such as aqueous ferrous sulfate solution followed by adjusting to a pH of 7 to 11, preferably a pH of about 9.0 and stirring to form a slurry.

(D) The formed precipitate is separated from the liquid to obtain a concentrated precipitate.

The ratio of divalent iron to total iron ($Fe^{2+}$/total iron) in the slurry can be made to be 0.3 or more, preferably 0.4 to 0.65, and the oxidation-reduction potential can be made to be −500 mV to −800 mV, preferably −620 mV to −680 mV versus Ag/AgCl electrode by repeating the aforementioned steps (B) to (D) while adjusting the contact surface area with the air interface. The resulting concentrated precipitate can be used as a water purification material of the present invention.

In addition, this water purification material can also be produced using an aqueous solution containing divalent iron and trivalent iron in the manner described below.

(E) Water such as ion exchange water is aerated with an inert gas such as 99.99% $N_2$ to remove the oxygen.

(F) A ferrous iron salt such as $FeSO_4.7H_2O$ and a ferric iron salt such as $Fe_2(SO_4)_3$ are added to the aforementioned water such as ion exchange water to prepare a solution containing $Fe^{2+}$ and $Fe^{3+}$ for which their ratio is $Fe^{2+}/Fe^{3+}=2$ (molar ratio).

(G) An alkaline compound such as NaOH is then added to this aqueous iron sulfate solution (solution containing $Fe^{2+}$ and $Fe^{3+}$) and mixed. The amount of an alkaline compound such as NaOH added is adjusted so that the ration of hydroxide ions to total Fe=2 (molar ratio). As a result, green rust(II) is formed as shown in the following reaction formula.

Here, the aforementioned steps (E) to (G) are carried out in an inert gas atmosphere such as 99.99% $N_2$.

(H) This precipitate is then recovered by solid-liquid separation and an alkaline compound such as calcium hydroxide is added again to adjust to a strongly alkaline pH of 11 to 13.

(I) Aqueous ferrous sulfate solution is added to this strongly alkaline precipitate followed by adjusting the pH to 7 to 11, preferably about 9.0 and stirring to form a slurry.

(J) The formed precipitate is then separated from the liquid to obtain a concentrated precipitate.

The ratio of divalent iron to total iron in the slurry ($Fe^{2+}$/total iron) can be made to be 0.3 or more, preferably 0.4 to 0.65, and the oxidation-reduction potential can be made to be −500 mV to −800 mV, preferably −620 mV to −680 mV, versus Ag/AgCl electrode by repeating the aforementioned steps (H) to (J) while adjusting the contact surface area with the air interface. The resulting concentrated precipitate can be used as a water purification material of the present invention.

This water purification material is preferably used under neutral or alkaline condition of pH 7 to 11, and more preferably pH 9 to 10. In the case of using this water purification material, there are no particular limitations on the temperature at which it is used, and it can be used even at normal temperatures. In addition, this water purification material is adequately contacted with wastewater under neutral or alkaline condition. It can be contacted with wastewater either continuously or in individual batches, and examples of methods that can be used for the type of apparatus include a method in which wastewater is contacted with precipitate in a tank using a stirring tank, a method in which the precipitate is filled into a packed column and contacted with wastewater, and a method in which the precipitate is contacted with wastewater by allowing to flow using a fluid bed. A divalent iron-based salt such as ferrous sulfate or ferrous chloride is added as necessary. In addition, the reduction reaction can be further accelerated by adjusting to a non-oxidizing atmosphere.

As a result of contacting this water purification material and wastewater, heavy metals contained in the wastewater are precipitated by being incorporated in the aforementioned iron-based precipitate, and removed from the wastewater. For example, heavy metal ions such as cadmium, lead, zinc, nickel, and manganese are incorporated in the precipitate as a result of being substituted for the iron. In addition, oxyanions such as hexavalent selenium and hexavalent chromium are incorporated in the iron-based precipitate of the water purification material as a result of being reduced to tetravalent selenium or metal selenium, or trivalent chromium. Moreover, oxyanions other than selenium and chromium, such as pentavalent arsenic and tetravalent arsenic are removed from wastewater by being incorporated in the loose layered structure of green rust.

In this manner, as a result of contacting wastewater with the aforementioned water purification material, heavy metals in the wastewater are removed from the wastewater by being incorporated in the aforementioned iron-based precipitate resulting in purification of the wastewater. In the case in which the reducing power of the water purification material decreases due to the accumulation of heavy metals following repeated use of the water purification material, the water purification material should be taken out of the tank and replaced with a fresh water purification material having potent reducing power.

This water purification material is able to effectively remove heavy metals from wastewater as a result of heavy metals contained in the wastewater being incorporated in a precipitate. More specifically, the concentration in wastewater of, for example, selenium, cadmium, chromium, lead, zinc, copper or nickel can be reduced to less than 0.01 mg/L, while the concentration in wastewater of arsenic or antimony can be reduced to less than 0.001 mg/L. In addition, in the case of using this reducing water purification material, heating is not required, and conversion of the precipitate to iron ferrite proceeds by incorporating wastewater heavy metals at normal temperatures. Moreover, since consolidated, compact precipitates are formed due to the conversion to iron ferrite, the precipitates can be dewatered easily thereby reducing the burden placed on post-treatment by the precipitate resulting in superior economy and ease of handling. Furthermore, since the precipitate is mainly including magnetite, it is magnetic and can be treated by adsorbing the separated precipitate on a magnet.

Next, the following provides an explanation of a wastewater treatment process and wastewater treatment apparatus of the present invention that uses a reducing iron compound precipitate similar to the aforementioned water purification material.

This wastewater treatment process is a treatment process that removes contaminants from wastewater by adding a reducing iron compound to wastewater containing contaminants to precipitate the contaminants followed by separating the precipitate from the liquid, having a step in which a reducing iron compound is added to wastewater (reducing iron compound addition step), a step in which the wastewater to which the reducing iron compound has been added is led to a reaction tank to form a precipitate (precipitation step), a step in which the formed precipitate (sludge) is separated from the liquid (solid-liquid separation step), and a step in which all or a portion of the separated sludge is alkalized and then returned to the reaction tank (sludge return step); wherein, in the precipitation step, wastewater to which the reducing iron compound has been added is mixed with alkaline sludge, allowed to react in a non-oxidizing atmosphere under alkaline condition to form a reducing iron compound precipitate, and contaminants are removed from the wastewater by being incorporated in the precipitate.

Figure 1:
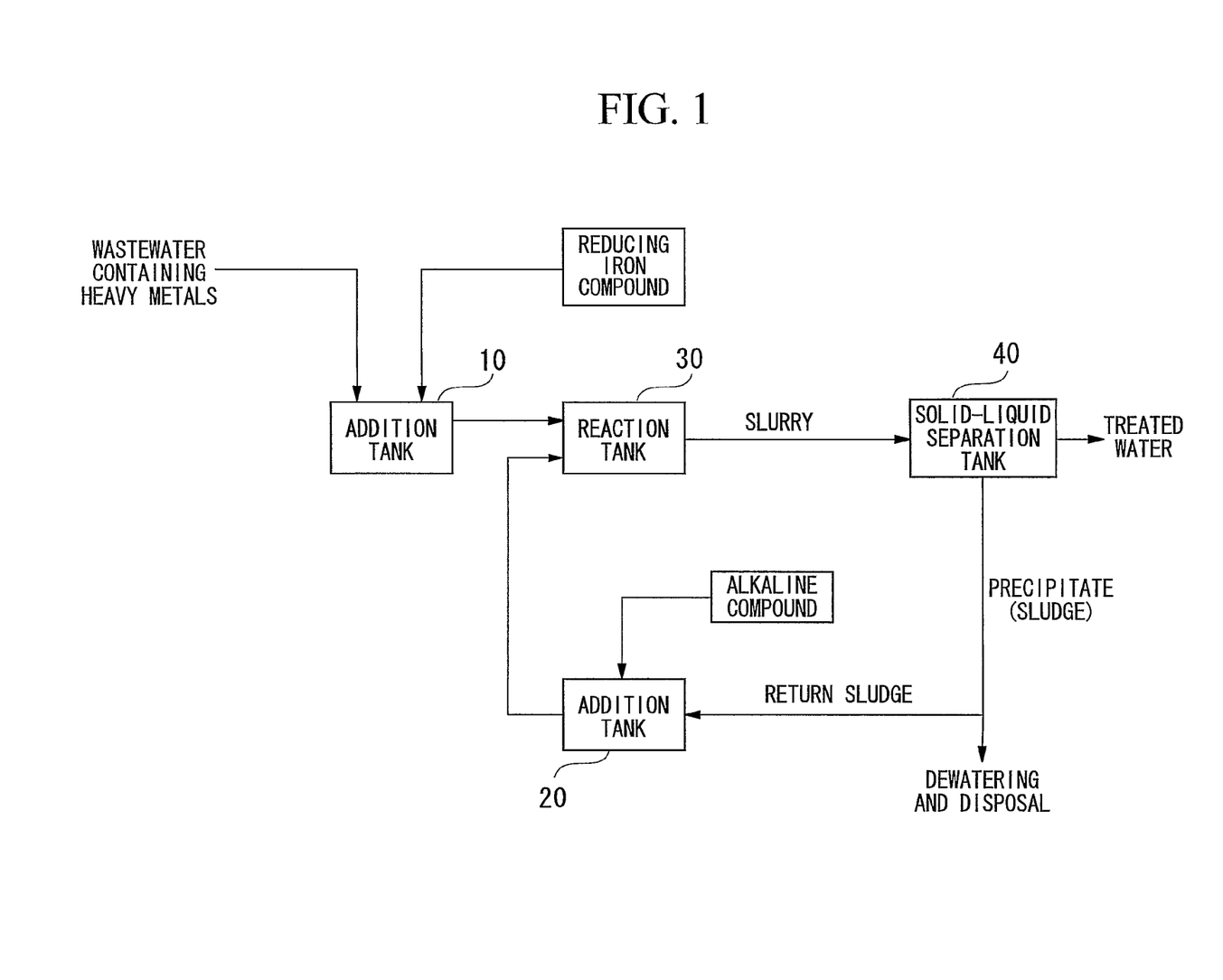
FIG. 1 is a flow chart showing an example of the treatment process of the present invention.

A rough flow chart showing an example of this treatment process is shown in FIG. 1. A treatment apparatus pertaining to the flowchart shown in this drawing is a treatment apparatus that treats wastewater containing contaminants in the form of heavy metals, and is provided with a tank 10 in which a reducing iron compound is added to the wastewater, a sealed reaction tank 30 containing a non-oxidizing atmosphere in which wastewater to which the reducing iron compound is added is allowed to react, a solid-liquid separation tank 40 as a means for solid-liquid separation of the slurry extracted from the reaction tank 30, a tank 20 in which an alkaline compound is added to the separated sludge, a line that returns the alkaline sludge to the reaction tank 30, and lines that connect each of these tanks and the solid-liquid separation means.

This treatment process and the treatment apparatus (to be referred to as a treatment system) has superior removal effects on contaminants contained in wastewater, such as one or more heavy metals selected from selenium, cadmium, hexavalent chromium, lead, zinc, copper, nickel, arsenic, and antimony. Wastewater containing these heavy metals is led to the addition tank 10 followed by addition of a reducing iron compound. Examples of reducing iron compounds that can be used include ferrous iron compounds such as ferrous sulfate ($FeSO_4$) and ferrous chloride ($FeCl_2$). The amount of ferrous iron compound added is suitably an amount such that the concentration of $Fe^{2+}$ ion is 400 to 600 mg/L. Wastewater to which has been added the reducing iron compound is led to the reaction tank 30.

In the reaction tank 30, wastewater to which has been added the reducing iron compound is mixed with alkaline sludge returned from the solid-liquid separation step. This alkaline sludge is adjusted to pH 11 to 13 by adding an alkaline compound to all or a portion of the precipitate (sludge) separated from a liquid in a later step. Examples of alkaline substances that can be added include calcium hydroxide, raw lime, sodium hydroxide, and a mixture of two or more thereof. These alkaline substances are used in a powder state as the alkaline compound. Alternatively, the alkaline substances are dissolved in a solvent such as water, thereafter used as the alkaline compound. The pH in the reaction tank 30 is adjusted to pH of 8.5 to 11, and preferably 9.0 to 10, by mixing with the alkaline sludge. In the reaction tank 30, a reducing iron compound precipitate is formed by mixing wastewater to which has been added a reducing iron compound with the alkaline returned sludge, and reacting in a non-oxidizing atmosphere. This iron compound precipitate is a mixture of green rust and iron ferrite, and is a reducing precipitate. As was previously stated, green rust is a bluish-green substance in which hydroxides of ferrous iron and ferric iron form layers, has a structure in which anions are incorporated between the layers, and is represented by, for example, the aforementioned formula (1). In addition, iron ferrite is a compound which includes mainly magnetite ($Fe^{II}OFe^{III}_2O_3$).

The treatment system of the present invention uses a sealed reaction tank isolated from the entrance of air, and allows the reaction to proceed in a non-oxidizing atmosphere and under alkaline condition of pH 8.5 to 11, and preferably pH 9.0 to 10, to form the aforementioned reducing iron compound precipitate in the reaction tank 30. The liquid temperature should be about 10° C. to 30° C., and heating is not required. The reaction time should be about 30 minutes to 3 hours.

Furthermore, even in the case of a treatment process that causes the formation of an iron compound precipitate by adding a ferrous iron compound and an alkaline compound to wastewater containing heavy metals, if the reaction tank is not sealed as in the prior art, the reaction is not carried out in a non-oxidizing atmosphere, or the degree of alkalinity is stronger than the above range of pH, a precipitate having the aforementioned reducing power is not formed, thereby preventing the obtaining of effects similar to those of the present invention.

In this treatment system, a precipitate is preferably formed so that the ratio of divalent iron ions to total iron ions ($Fe^{2+}$/Fe(T)) of the aforementioned precipitate is 0.4 to 0.8, and the aforementioned ion ratio is more preferably controlled to 0.55 to 0.65, so that the aforementioned iron compound precipitate including a mixture of green rust and iron ferrite has reducing power. In the case in which this ratio is outside the aforementioned range, reduction of heavy metals becomes inadequate, or the settling properties of the precipitate deteriorate, thereby making this undesirable. Heavy metals contained in wastewater are reduced and easily incorporated in the precipitate by forming the aforementioned reducing iron compound precipitate.

As a result of repeatedly returning the alkaline sludge to the reaction tank 30 and repeating the reaction with wastewater to which the reducing iron compound has been added, the initially deep bluish-green precipitate is gradually oxidized to green rust and then becomes black due to conversion to iron ferrite. Since reducing power is lost when the majority of the green rust is converted to iron ferrite, in the treatment process of the present invention, the ratio of divalent iron ions to total iron ions ($Fe^{2+}$/Fe(T)) of the aforementioned iron compound precipitate is controlled to within the aforementioned range to form a precipitate having reducing power.

In this treatment system, by repeatedly separating the aforementioned reducing sludge (iron compound precipitate), alkalizing all or a portion of it and returning it to the reaction tank, reacting in a non-oxidizing atmosphere, and again precipitating the reducing sludge, since the sludge (precipitate) is converted to iron ferrite while maintaining its reducing power, consolidation of the precipitate proceeds, and since the concentration of the precipitate increases significantly, reduction of heavy metals in the wastewater proceeds and removal effects are improved. Here, the precipitate (sludge) including mainly iron hydroxide has a high apparent density and places a large burden on wastewater treatment. In addition, in the treatment process of the present invention, since the iron ferrite that forms a precipitate is mainly including magnetite, it is magnetic and can be treated by adsorbing the separated precipitate on a magnet.

The slurry that has been discharged from the reaction tank 30 is led to a solid-liquid separation means such as a thickener in which it is separated by allowing the sludge to settle to the bottom of the tank. Heavy metals can be removed from the wastewater by solid-liquid separation of this precipitate. In addition, as was previously stated, an alkaline compound is added to all or a portion of the sludge to adjust the pH to 11 to 13, then it is returned to the reaction tank 30 and the precipitate formation reaction is repeated in the reaction tank 30. The proportion of sludge that is returned (returned sludge circulation ratio) should be determined so that the ratio of divalent ions to total iron ions of the precipitate that forms in the reaction tank 30 ($Fe^{2+}$/Fe(T)) is within the aforementioned range. Furthermore, the treatment process of the present invention can be carried out in batches or continuously.

The following provides a specific example of this treatment system. A ferrous iron compound is added to and dissolved in wastewater having an initial selenium concentration of 2 mg/L so as to adjust an $Fe^{2+}$ ion concentration to 400 to 600 mg/L. A precipitate slurry, of which the pH has been adjusted to pH 11 to 13 by addition of an alkaline compound, is mixed into this wastewater to which the ferrous iron compound has been added, and allowed to react for 30 minutes to 3 hours at pH 9.0 to 9.3 and at a temperature of 10° C. to 30° C. in a sealed reaction tank isolated from the entrance of air. By then repeatedly separating the resulting precipitate from a liquid, adding an alkaline compound to a portion of the precipitate and returning to the reaction tank, the selenium concentration in the wastewater can be reduced to 0.01 mg/L or less.

In the treatment system relating to the flow chart shown in FIG. 1, two or more reaction tanks 30 should be arranged in series, the tanks should be sealed from air by purging with nitrogen, and the aforementioned ferrite conversion treatment should be carried out in a non-oxidizing atmosphere.

Figure 3:
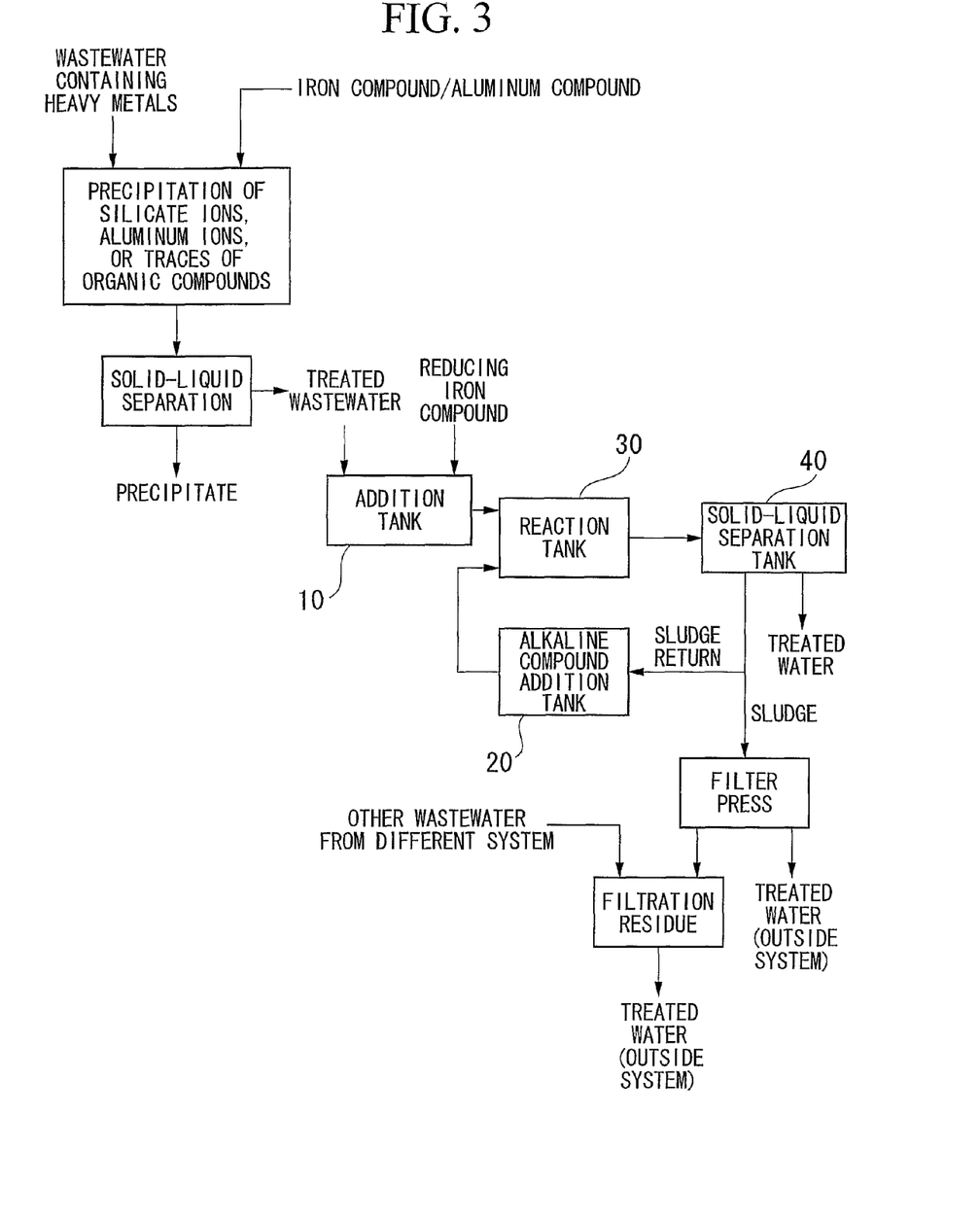
FIG. 3 is a flow chart showing an example of the treatment steps of the present invention that include a pretreatment step.

In the case in which silicate ions, aluminum ions, or traces of organic compounds are additionally contained in the aforementioned wastewater containing contaminants, the aforementioned ferrite conversion may be affected by these ions, thereby lowering contaminant removal effects. With respect to such wastewater, it is preferable to provide a pretreatment step for removing silicate ions and so forth prior to the reducing iron compound addition step as shown in FIG. 3 wherein an iron compound or aluminum compound is added to the wastewater to form a precipitate, followed by filtering the precipitate.

In the aforementioned pretreatment step, by adding an iron compound to wastewater containing contaminants and then adding an alkaline compound to form an iron hydroxide under alkaline condition, at least one of the silicate ions, aluminum ions, and traces of organic compounds are co-precipitated with the iron hydroxide precipitate, and this precipitate is removed from the wastewater by solid-liquid separation. A ferric iron compound such as ferric chloride is preferably for the iron compound. An aluminum compound may be used instead of the iron compound. The aluminum compound is added to the wastewater followed by the addition of an alkaline compound to precipitate aluminum hydroxide under alkaline condition. Since silicate ions and traces of organic compounds are incorporated in this precipitate, they are removed from the wastewater by solid-liquid separation. When the aforementioned reducing iron compound addition step, precipitation step, solid-liquid separation step, and sludge return step are carried out on treated wastewater from which silicate ions, aluminum ions, or traces of organic compounds, which affect ferrite conversion, have been removed by this pretreatment, the aforementioned ferrite conversion is not inhibited, making it possible to enhance the effects of removing heavy metals in the wastewater. The pretreatment step is preferably provided with a tank in which an iron compound or aluminum compound is added to the wastewater, and a liquid-separation means for the formed precipitate, prior to the tank in which a reducing iron compound is added to wastewater containing contaminants.

In addition, as was previously stated, although all or a portion of the sludge separated in the solid-liquid separation means is returned to the reaction tank after being alkalized, sludge that is not returned to the reaction tank is dewatered by filtering with a filter press and so forth, after which the moisture is discharged outside the system. On the other hand, since the filtration residue still has residual reducing power and satisfactory water permeability, wastewater from a separate system in which the degree of contamination is not high can be passed through this filtration residue as shown in FIG. 3 to degrade contaminants contained in this wastewater and remove them by utilizing the reducing power remaining in the filtration residue.

According to this treatment process, the concentration of heavy metals in wastewater can be reduced to 0.01 mg/L or less. Moreover, this treatment process does not require heating, iron ferrite conversion can be carried out at normal temperatures, and a consolidated, compact precipitate is formed, the precipitate can be dewatered easily and heavy metal removal effects are high, thereby resulting in superior economy and ease of handling.

Next, an explanation is provided of a treatment apparatus capable of promoting precipitation or enhancing solid-liquid separation effects by applying a variable magnetic field to either or both of the precipitation reaction tank and the precipitate separation tank in the aforementioned treatment system.

Figure 4:
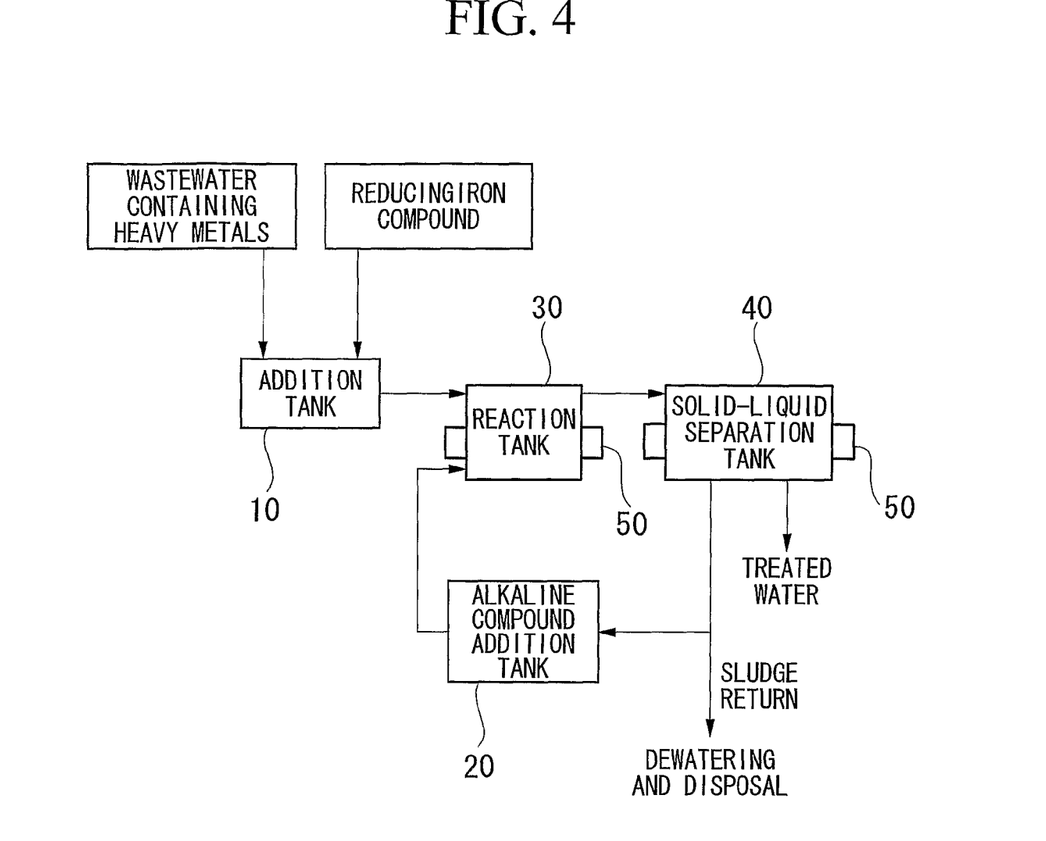
FIG. 4 is a flow chart showing an example of the treatment steps of the present invention provided with a variable magnetic field means.
Figure 5:
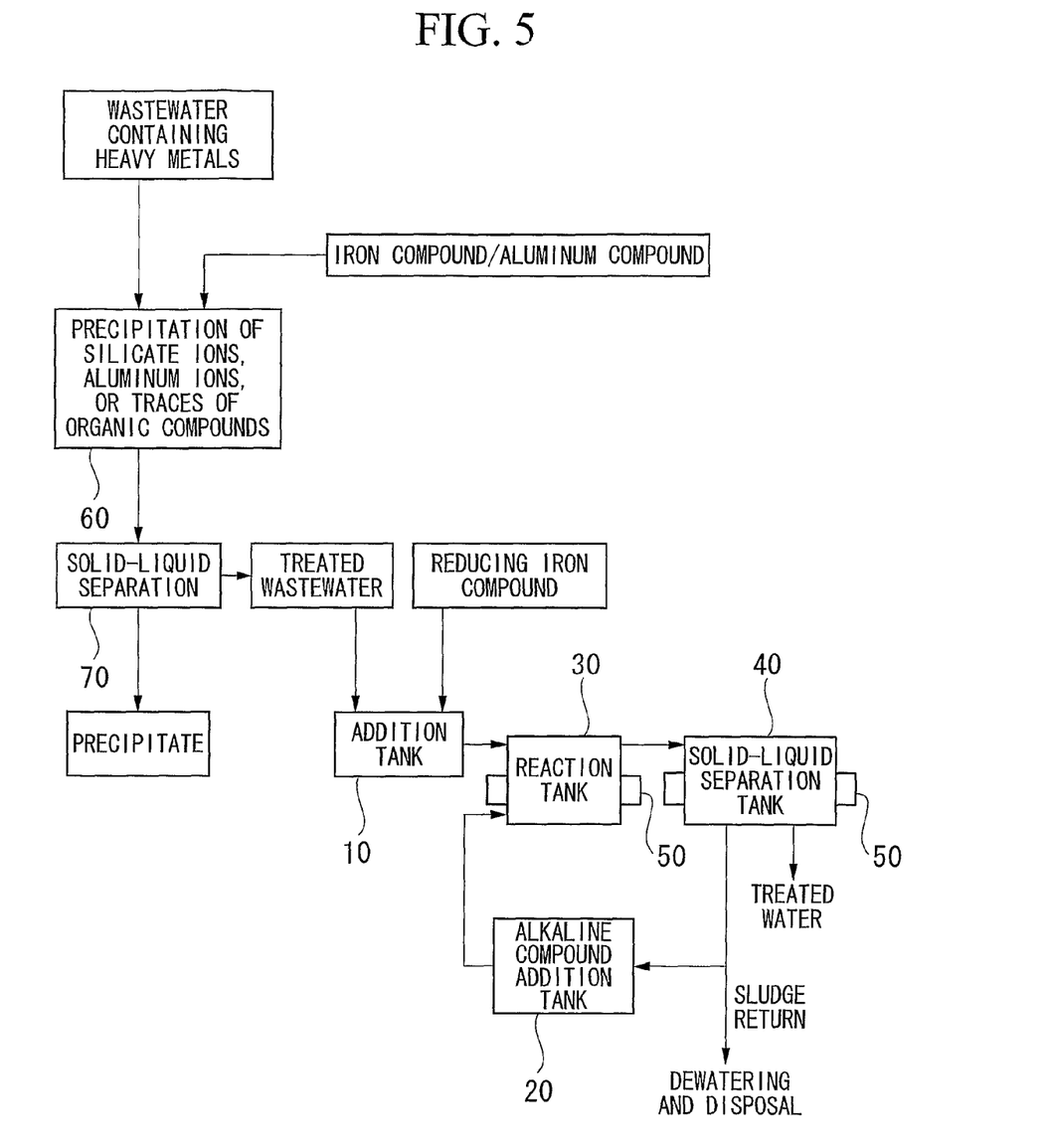
FIG. 5 is a flow chart showing an example of the treatment steps of the present invention provided with a variable magnetic field means and including a pretreatment step.

An example of a treatment system having this variable magnetic field means is shown in FIGS. 4 and 5.

The treatment apparatus relating to the treatment steps of FIG. 4 is provided with a tank 10 in which a reducing iron compound is added to wastewater containing heavy metals, a sealed reaction tank 30 containing a non-oxidizing atmosphere in which heavy metals in the wastewater are precipitated by reacting with the reducing iron compound, a tank 40 in which slurry extracted from the reaction tank 30 is subjected to solid-liquid separation, a tank 20 in which an alkaline compound is added to the separated sludge, a line for returning the alkaline sludge to the reaction tank 30, and lines that connect each of the tanks and solid-liquid separation means, wherein a means 50 that applies a variable magnetic field is provided at least in the reaction tank 30 or the solid-liquid separation tank 40.

For example, a constitution may be employed in which a rotatable support frame (not shown) is provided around the periphery of the reaction tank 30 for means 50 that applies a variable magnetic field, and magnets (not shown) are provided on the support frame so as to surround the reaction tank 30. As a result, a magnetic field can be formed that includes the inside of the reaction tank, and by rotating the support frame, the magnetic field is made to rotate and fluctuate. Alternatively, a constitution may be employed in which a support frame is provided that oscillates up and down instead of the rotatable support frame, and the magnetic field is made to oscillated up an down by oscillating up and down the support frame with the magnets attached thereto. In addition, a constitution may be employed that is provided with a plurality of electromagnets, wherein the magnetic field is made to fluctuate electrically by switching the current applied to the electromagnets. Since ferrite conversion proceeds within the reaction tank resulting in the formation of a magnetic precipitate, this ferrite conversion can be further promoted by applying a variable magnetic field.

In addition to the structure described above, a constitution may be employed in which a support frame (not shown), for example, that surrounds the center of the inside of the tank, may be provided upright for magnetic field fluctuating means 50 of the solid-liquid separation tank 40, and electromagnets (not shown) are provided on the support frame. By switching the current applied to the electromagnets, the magnetic field can be fluctuated by continuously forming a magnetic field. As a result of forming a magnetic field, aggregation of the magnetized precipitate is promoted, while settling of the aggregates is promoted by canceling the magnetic field.

With the exception of the constitution relating to means 50 for applying a variable magnetic field, the aforementioned treatment apparatus is similar to the treatment apparatus relating to the treatment steps of FIG. 1. Namely, wastewater containing heavy metals is led to the addition tank 10 followed by the addition of a reducing iron compound. Wastewater to which the reducing iron compound has been added is then led to the reaction tank 30.

In the reaction tank 30, alkaline sludge returned from a solid-liquid separation step is mixed with the wastewater to which has been added the reducing iron compound. The pH of this alkaline sludge has been adjusted to pH 11 to 13 by the addition of an alkaline compound to all or a portion of the precipitate (sludge) that has been separated from the liquid in a subsequent step. The pH in the reaction tank 30 is adjusted to pH 8.5 to 11, and preferably 9.0 to 10, as a result of mixing in this alkaline sludge. In the reaction tank 30, wastewater to which has been added the reducing iron compound is mixed with the alkaline return sludge and allowed to react in a non-oxidizing atmosphere, resulting in the formation of a reducing iron compound precipitate. This iron compound precipitate is a reducing precipitate comprised of a mixture of green rust and iron ferrite. A sealed reaction tank isolated from the entrance of air is used for the aforementioned reaction tank 30 in order to form the aforementioned reducing iron compound precipitate. In the reaction tank 30, the reaction is carried out in a non-oxidizing atmosphere under alkaline condition of a pH of 8.5 to 11, and preferably 9.0 to 10. The temperature is only required to be about 10° C. to 30° C., and heating is not required. The reaction time should be about 30 minutes to 3 hours.

As a result of repeatedly returning the alkaline sludge to the reaction tank 30 and repeating the reaction with the wastewater to which has been added the reducing iron compound, the initially deep bluish-green precipitate is gradually oxidized to green rust and then becomes black due to conversion to iron ferrite. Since reducing power is lost when the majority of the green rust is converted to iron ferrite, the ratio of divalent iron ions to total iron ions ($Fe^{2+}/Fe(T)$) of the aforementioned precipitate is preferably controlled to within the range of 0.55 to 0.65 by causing the precipitate to form such that the aforementioned ratio is 0.4 to 0.8.

By repeatedly separating the aforementioned reducing sludge (iron compound precipitate), returning all or a portion thereof to the reaction tank after alkalizing, allowing to react in a non-oxidizing atmosphere and then again precipitating the reducing sludge, consolidation of the precipitate proceeds since the sludge (precipitate) is converted to iron ferrite while maintaining its reducing power, and the concentration of the precipitate is increased considerably, thereby improving the effect of removing heavy metals. In this manner, since conversion of the precipitate to ferrite proceeds within the reaction tank and the precipitate that forms is magnetic, this ferrite conversion can be further promoted by applying a variable magnetic field.

Furthermore, a plurality of the aforementioned reaction tank 30 should be provided in series, and the formed slurry should be transferred to each tank in a stepwise manner to promote the ferrite conversion reaction. Variable magnetic field means 50 may be provided in any of the reaction tanks. Moreover, the upper portion of the reaction tank should be of a form that is covered with a lid, and together with having a small hole in the lid for insertion of a shaft member of a stirrer, should have a shape in which it inclines upward toward the aforementioned small hole. As a result of making the reaction tank to have this form, the inside of the reaction tank that is continuous with the outside air is limited to that which passes through the small hole, thereby maintaining the non-oxidizing atmosphere inside. In addition, since gas generated inside the tank is led to the small hole along the incline of the lid, it is able to escape to the outside through the minute gap around the aforementioned shaft member.

The slurry that has been discharged from the reaction tank 30 is led to a solid-liquid separation tank 40 such as a thickener in which it is separated by allowing the sludge to settle to the bottom of the tank. A means 50 that applies a variable magnetic field is provided in this solid-liquid separation tank 40, and by forming a variable magnetic field, aggregation of magnetized precipitate is promoted, while precipitation of the aggregate can be promoted by canceling the magnetic field.

The treatment apparatus relating to the treatment steps shown in FIG. 5 is an example of a treatment apparatus provided with a constitution relating to a pretreatment step having a tank 60, in which a precipitate is formed by adding an iron compound or aluminum compound to wastewater, and a solid-liquid separation tank 70, which removes the precipitate, prior to the reducing iron compound addition tank 10. The other aspects of this treatment apparatus are the same as the treatment apparatus relating to the treatment steps shown in FIG. 4. Since silicate ions, aluminum ions and traces of organic compounds in the wastewater cause inhibition of the ferrite conversion in the reaction tank, by removing these in advance in a pretreatment step, ferrite conversion proceeds smoothly and the effects of removing heavy metals can be enhanced.

Example 1

Wastewater containing heavy metals was treated in the manner described below using a batch system in accordance with the flow chart showing an example of the treatment process of the present invention shown in FIG. 1. First, 2.0 L of wastewater containing contaminants (heavy metal concentrations: 2 mg/L each) were led into the addition tank 10 followed by the addition of ferrous sulfate to an Fe(II) concentration of 600 mg/L. On the other hand, the entire amount of separated precipitate was returned to the alkaline compound addition tank 20 followed by the addition of 1.5 g of calcium hydroxide to adjust to a strongly alkaline pH of 12. This strongly alkaline precipitate was returned to the reaction tank, mixed with wastewater to which was added ferrous sulfate and allowed to react for 2 hours. Next, slurry extracted from the reaction tank was separated into solid and liquid by causing the precipitate to settle by allowing to settle undisturbed for 20 hours in a thickener. The entire amount of this precipitate was adjusted to a strongly alkaline pH as described above and returned to the reaction tank to repeat formation and separation of the precipitate 30 times. The treatment conditions and treatment results are shown in Table 1.

TABLE 1

|  | Example 1 | Example 2 | Example 3 | Comparative Example 1 | Comparative Example 2 |
| --- | --- | --- | --- | --- | --- |
| (Reducing iron compound addition step) | | | | | |
| ferrous iron compound added amount | $FeSO_4$ | $FeCl_2$ 600 mg/L as Fe(II) | $FeSO_4$ | $FeSO_4$ | $FeSO_4$ 2000 mg/L as Fe(II) |

TABLE 1-continued

|  | Example 1 | Example 2 | Example 3 | Comparative Example 1 | Comparative Example 2 |
|---|---|---|---|---|---|
| (Alkaline compound addition Step) |  |  |  | Sludge not containing calcium hydroxide was returned to reaction tank | Calcium hydroxide was added to wastewater before mixing with return sludge |
| Alkaline compound | Calcium hydroxide | Calcium hydroxide | Calcium hydroxide | Calcium hydroxide was added to reaction tank | Sludge not containing calcium hydroxide was returned to reaction tank |
| Added amount | 1.5 | 1.5 | 1.5 |  |  |
| pH of sludge slurry | 12 | 12 | 12 | pH of reaction tank: 9.0 to 9.3 | pH of reaction tank: 9.0 to 9.3 |
| (Precipitation Step) |  |  |  |  |  |
| Reaction time | 120 min. | 120 min. | 60 min. | 60 min. | 60 min. |
| Temperature | 20° C. | 20° C. | 20° C. | 20° C. | 20° C. |
| Atmosphere | isolation from oxygen | isolation from oxygen | isolation from oxygen | presence of air | presence of air |
| pH | 9.0 to 9.3 | 9.0 to 9.3 | 9.0 to 9.3 | 9.0 to 9.3 | 9.0 to 9.3 |
| (Solid-liquid Separation Step) |  |  |  |  |  |
| Standing time | 20 hours | 20 hours | 20 hours | 20 hours | 20 hours |
| amount of returned sludge | entire amount | entire amount | entire amount | entire amount | entire amount |
| Ferrite conversion of precipitate | A | A | A | B | B |
| Consolidation of precipitate | A | A | A | C | C |
| Cocentrations of heavy metals in wastewater |  |  |  |  |  |
| Se | <0.01 | <0.01 | <0.01 | 0.02 | 0.03 |
| Cd | <0.01 | <0.01 | <0.01 | 0.01 | 0.02 |
| Cr (VI) | <0.01 | <0.01 | <0.01 | 0.04 | 0.06 |
| Pb | <0.01 | <0.01 | <0.01 | 0.01 | 0.02 |
| Zn | <0.01 | <0.01 | <0.01 | 0.02 | 0.03 |
| Cu | <0.01 | <0.01 | <0.01 | 0.04 | 0.06 |
| As | <0.01 | <0.01 | <0.01 | 0.02 | 0.03 |
| Sb | <0.01 | <0.01 | <0.01 | 0.02 | 0.03 |
| Ni | <0.01 | <0.01 | <0.01 | 0.02 | 0.02 |

Note:
In the table, $FeSO_4$ indicates $FeSO_4 \cdot 7H_2O$, A indicates satisfactory results, B indicates unsatisfactory results to some degree, and C indicates poor results. The concentrations of heavy metals are shown by mg/L.

Examples 2 and 3 and Comparative Examples 1 and 2

Figure 2:
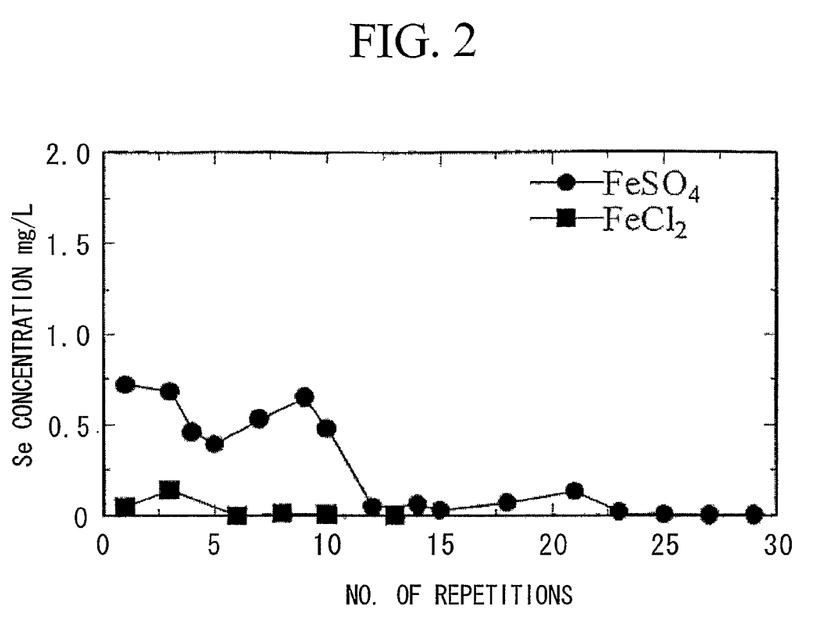
FIG. 2 is a graph showing the relationship between selenium concentration in wastewater and the number of treatment cycles in Examples 1 and 2.

Wastewater containing heavy metals was treated in the same manner as Example 1 with the exception of using the treatment conditions shown in Table 1. Those results are shown in Table 1. In addition, the selenium concentrations in the wastewater corresponding to the number of treatment cycles in Example 1 and Example 2 are shown in the graph of FIG. 2.

As shown in the results of Table 1, as a result of repeating the wastewater treatment according to the present treatment process, the precipitate was converted to ferrite at normal temperatures, a highly consolidated precipitate was formed, and the heavy metal concentrations in the wastewater were able to be reduced to the environmental standard of 0.01 mg/L or less.

Example 4

Aqueous ferric chloride solution was added to a concentration of 1.0 ml/L to 2 L of simulated wastewater containing 100 ppm each of silicate ions and aluminum ions as well as 2 ppm of selenium. The pH of the wastewater was then adjusted to 8 to 8.5 by addition of an alkaline compound to form a precipitate. After separating this precipitate by filtration, the filtrate was treated in the same manner as Example 1.

On the other hand, results obtained by carrying out treatment in the same manner as Example 1 without carrying out this pretreatment are shown in Table 2 for comparison.

As shown in Table 2, in wastewater in which the concentrations of aluminum ions and silicate ions were reduced to 1 ppm and 15 ppm, respectively, by carrying out pretreatment, the concentration of selenium was reduced to less than 0.01 ppm as a result of ferrite conversion treatment, and since ferrite conversion was allowed to proceed adequately, high removal effects were achieved.

On the other hand, the selenium concentration of wastewater not subjected to pretreatment was 0.07 ppm after treatment, thus demonstrating removal effects that were lower than in the case of pretreatment.

TABLE 2

|  | Raw wastewater | | | After pretreatment | |
| --- | --- | --- | --- | --- | --- |
|  | $Al^{3+}$ | $SiO_2$ | Se | $Al^{3+}$ | $SiO_2$ |
| Example 4 | 100 ppm | 100 ppm | 2 ppm | 1 ppm | 15 ppm |
| Comparative sample | 100 ppm | 100 ppm | 2 ppm | No pretreatment | |

|  | After ferrite conversion treatment Se | Ferrite conversion of precipitate |
| --- | --- | --- |
| Example 4 | <0.01 ppm | A |
| Comparative sample | 0.07 ppm | B |

Note:
A indicates satisfactory results, and B indicates unsatisfactory results to some degree.

Example 5

Aqueous ferric chloride solution was added to a concentration of 1.0 ml/L to 2 L of simulated wastewater containing 50 ppm of traces of organic compounds (TOC) and 2 ppm of selenium followed by the addition of an alkaline compound to adjust the pH of the wastewater to 8 to 8.5 and form a precipitate. The precipitate was separated by filtration and the TOC concentration of the wastewater decreased to 20 ppm or less. This filtrate was treated in the same manner as Example 1.

On the other hand, results obtained by carrying out treatment in the same manner as Example 1 without carrying out this pretreatment are shown in Table 3 for comparison.

As shown in Table 3, wastewater subjected to pretreatment demonstrated a low concentration of selenium, a volume ratio of concentrated sludge was 20, the sludge was strongly magnetic, and ferrite conversion proceeded adequately.

On the other hand, wastewater not subjected to pretreatment demonstrated a somewhat high selenium concentration, the volume ratio of concentrated sludge was 25, the sludge was weakly magnetic, and ferrite conversion was inadequate.

Here, the volume ratio of concentrated sludge refers to a ratio of a total volume of a slurry before settling to a volume of a sedimentation volume of slurry after settling (volume ratio of concentrated sludge=(total volume of slurry before settling)/(sedimentation volume of slurry after settling)).

TABLE 3

|  | Raw wastewater | | After pretreatment |
| --- | --- | --- | --- |
|  | TOC | Se | TOC |
| Example 5 | 50 ppm | 2 ppm | <20 ppm |
| Comparative sample | 50 ppm | 2 ppm | No pretreatment |

|  | After ferrite conversion treatment | | |
| --- | --- | --- | --- |
|  | Se | Volume ratio of Concentrated sludge (%) | Magnetism |
| Example 5 | <0.01 | 20 | Strong |
| Comparative sample | 0.08 | 25 | Weak |

Note:
Volume ratio of concentrated sludge = (total volume of slurry before settling)/(sedimentation volume of slurry after settling)

Example 6

Wastewater containing heavy metals was treated in the manner described below using a batch system in accordance with the flow chart showing an example of the treatment process of the present invention shown in FIG. 3. First, 2.0 L of wastewater containing heavy metals (heavy metal concentrations: 2 mg/L each) were led into the addition tank 10 followed by the addition of ferrous sulfate to an Fe(II) concentration of 600 mg/L. On the other hand, the entire amount of separated precipitate from the liquid was returned to the alkaline compound addition tank 20 followed by adding 1.5 g of calcium hydroxide to adjust to a strongly alkaline pH of 12. This strongly alkaline precipitate was returned to the reaction tank, mixed with wastewater to which was added ferrous sulfate and allowed to react for 2 hours.

Next, the slurry extracted from the reaction tank was allowed to settle undisturbed for 20 hours in a thickener, thereby the precipitate was separated by sedimentation from a liquid. The entire amount of this precipitate was adjusted to a strongly alkaline pH as described above and returned to the reaction tank to repeat formation and separation of the precipitate 60 times. The resulting excess precipitate was filtered with a filter press to obtain 790 g (wet weight) of a filtration residue.

When other wastewater containing heavy metal apart from the aforementioned wastewater containing heavy metal was adjusted to pH of 9, and 2.0 L thereof was passed through this filtration residue, the concentrations of the heavy metals in the wastewater all decreased to 1/10 or less of their original concentrations as shown in Table 4. The heavy metal concentrations before the wastewater was passed through the filtration residue (before treatment) and after passing through the filtration residue (after treatment) are shown in Table 4.

TABLE 4

| (mg/L) | Cd | Cr | Pb | Cu | Sb | Zn |
| --- | --- | --- | --- | --- | --- | --- |
| Before treatment | 1 | 1 | 1 | 1 | 1 | 1 |
| After treatment | <0.1 | <0.1 | <0.1 | <0.1 | <0.1 | <0.1 |

Example 7

Ferrous sulfate was added to 2 L of water to an Fe(II) concentration of 600 mg/L to prepare a starting liquid. Calcium hydroxide was added to this to adjust the pH to 9.0 and form a precipitate. This precipitate was recovered by solid-liquid separation after which calcium hydroxide was again added to adjust to a strongly alkaline pH of 12.

This strongly alkaline precipitate was added to an aqueous ferrous sulfate solution containing 600 mg/L as Fe(II), followed by adjusting the pH to 9.0 and stirring to prepare a slurry. At this time, the contract surface area with an air interface in a stirring device was adjusted so that a ratio of divalent iron to total iron ($Fe^{2+}/Fe(T)$) in the slurry was 0.4 to 0.65, and an oxidation reduction potential was −620 mV to −680 mV versus Ag/AgCl electrode.

A concentrated precipitate was obtained by solid-liquid separation of the formed precipitate. The procedure in which this precipitate was adjusted to a strong alkaline pH of about 12 followed by being added to the aforementioned aqueous ferrous sulfate solution to obtain a concentrated precipitate was repeated 25 times to obtain 0.38 L of a concentrated precipitate slurry having a solid-liquid concentration of 140 g/L.

2.0 L of simulated wastewater containing the metal ions shown in Table 1 were contacted with this concentrated precipitate, a pH was adjusted to about 9, and stirred for 2 hours followed by solid-liquid separation and measurement of the metal ion concentrations in the liquid. Those results are shown in Table 5.

As shown in Table 5, the concentrations of heavy metal ions in the wastewater treated with the water purification material of the present invention were reduced considerably. More specifically, the concentrations in the wastewater of selenium, cadmium, chromium, lead, zinc, copper and nickel were all reduced to less than 0.01 mg/L, while the concentrations of arsenic and antimony in the wastewater were reduced to less than 0.001 mg/L. In addition, the concentrations of molybdenum, boron, manganese and fluorine were also reduced considerably.

TABLE 5

| Element | Raw water (mg/L) | Treated water (mg/L) |
| --- | --- | --- |
| Se | 2 | <0.001 |
| Cu | 1 | <0.01 |
| Cr | 1 | <0.01 |
| Mo | 1 | 0.06 |
| B | 2 | 0.88 |
| Sb | 1 | <0.001 |
| Pb | 1 | <0.01 |
| As | 1 | <0.001 |
| Zn | 1 | <0.01 |
| Cd | 1 | <0.01 |
| Ni | 1 | <0.01 |
| Mn | 1 | 0.03 |
| F | 10 | 5.2 |

Example 8

A precipitate was produced by carrying out the following procedure in an inert atmosphere. Ferrous sulfate and ferric sulfate were added to 2 L of water aerated with inert gas to a concentration of 400 mg/L as Fe (II) and concentration of 200 mg/L as Fe(III). Next, NaOH was added to this to adjust the ratio of hydroxide ions/total Fe (molar ratio) to 2. The precipitate that formed as a result of this was recovered by solid-liquid separation.

Using the precipitate produced in the aforementioned process as the starting substance, the procedure of obtaining a concentrated precipitate by adding the precipitate to an aqueous ferrous sulfate solution was repeated. First, NaOH was added to the precipitate to adjust to a strong alkaline pH of about 12. This strongly alkaline precipitate was added to aqueous ferrous sulfate solution containing 600 mg/L as Fe(II), followed by adjusting the pH to 9.0 and stirring to prepare a slurry.

A concentrated precipitate was obtained by separating the precipitate that formed from the liquid. The procedure of making this precipitate strongly alkaline followed by obtaining a concentrated precipitate by addition of the aforementioned aqueous ferrous sulfate solution was repeated 25 times while adjusting the contact surface area with the air interface so that the ratio of divalent iron to total iron ($Fe^{2+}$/total Fe) in the slurry was 0.4 to 0.65, and the oxidation-reduction potential was −620 mV to −680 mV versus Ag/AgCl electrode.

As a result, 0.38 L of concentrated precipitate slurry were obtained having a solid-liquid concentration of 140 g/L. 2.0 L of simulated wastewater containing the metal ions shown in Table 1 were contacted with this concentrated precipitate and stirred for 2 hours followed by solid-liquid separation and measurement of the metal ion concentrations in the liquid. The results were similar to those of Example 7.

INDUSTRIAL APPLICABILITY

The water purification material of the present invention can be used at normal temperatures, is able to effectively remove heavy metals contained in wastewater, and offers superior economy. In addition, the wastewater treatment process and treatment apparatus of the present invention include a wastewater treatment system having a simple process and superior practicality as well as superior economy by being able to effectively remove contaminants contained in wastewater at normal temperatures with satisfactory efficiency.

The invention claimed is:

1. A method for producing a reducing water purification material, comprising the steps of:
   A) adding an alkaline compound to an aqueous solution of a ferrous salt to alkalinize at a pH of 7 to 11, thereby forming an iron-based precipitate;
   B) separating the iron-based precipitate by a solid-liquid separation and recovering the iron-based precipitate, and further adding an alkaline compound to adjust a pH between 11 to 13 to form a strong alkaline iron-based precipitate;
   C) adding the strong alkaline precipitate to an aqueous solution of a ferrous salt, and adjusting a pH between 7 and 11 and stirring to form a slurry; and
   D) separating a formed precipitate in the slurry by a solid-liquid separation to form a concentrated precipitate and
   repeating the steps B), C) and D) with the concentrated precipitate to obtain a reducing water purification material including an iron-based precipitate comprising a mixture of green rust and iron ferrite, or a mixture of green rust, iron ferrite and reducing iron hydroxide,
   wherein a ratio of divalent iron to total iron ($Fe^{2+}$/total Fe) in the slurry is made to be 0.3 or more, and an oxidation-reduction potential of the slurry is made to be −500 mV to −800 mV versus Ag/AgCl electrode, by repeating the steps B), C) and D) while adjusting contact surface areas with an air interface.

2. A method for producing a reducing water purification material, comprising the steps of:
   A) aerating water with an inert gas to remove oxygen in the water;
   B) adding a ferrous salt and a ferric salt to the water to form an aqueous solution containing $Fe^{2+}$ and $Fe^{3+}$ at a molar ratio $Fe^{2+}/Fe^{3+}$ of 2;
   C) adding an alkaline compound to the aqueous solution containing $Fe^{2+}$ and $Fe^{3+}$ to adjust a molar ratio of hydroxide ions to total Fe to 2, thereby forming a precipitate;
   D) separating the formed precipitate by a solid-liquid separation and recovering the precipitate, and further adding an alkaline compound to adjust a pH between 11 and 13 to form a strong alkaline iron-based precipitate;
   E) adding the strong alkaline iron-based precipitate to an aqueous solution of a ferrous salt, followed by adjusting a pH between 7 and 11 and stirring to form a slurry;
   F) separating a formed precipitate in the slurry by a solid-liquid separation to form a concentrated precipitate; and
   repeating the steps D)-F) with the concentrated precipitate to obtain a reducing water purification material including an iron precipitate comprising a mixture of green rust and iron ferrite, or a mixture of green rust, iron ferrite and reducing iron hydroxide, wherein a ratio of divalent iron to total iron Fe ($Fe^{2+}$/total Fe) in the reducing iron-based precipitate is made to be 0.3 or more, and an oxidation-reduction potential of the slurry is made to be −500 mV to −800 mV versus Ag/AgCl electrode, by carrying out the steps A)-C) and repeating the steps D)-F) while adjusting contact surface areas with an air interface.

3. A reducing water purification material produced by the method according to claim 1 or claim 2, the material including a reducing iron-based precipitate comprising a mixture of green rust and iron ferrite, or a mixture of green rust, iron ferrite and reducing iron hydroxide, the iron ferrite being converted from green rust and mainly comprising magnetite.

4. The reducing water purification material according to claim 1, wherein a ratio of divalent iron to total iron ($Fe^{2+}$/total Fe) in the reducing iron-based precipitate is 0.4 or more.

5. The reducing water purification material according to claim 1, wherein the reducing water purification material comprises a slurry in which the reducing iron-based precipitate is dispersed in water, an oxidation-reduction potential of the slurry is −620 mV to −680 mV versus Ag/AgCl electrode, and a pH of the slurry is 9 to 10.

6. The reducing water purification material according to claim 1, wherein the reducing water purification material is used for removing one or more of selenium, copper, hexavalent chromium, molybdenum, boron, antimony, lead, arsenic, zinc, cadmium, nickel, manganese, fluorine, tin, phosphorous, cobalt, and organochlorine compounds of trichloroethylene and dichloroethylene, which are contained in a wastewater.

7. The reducing water purification material according to claim 1, wherein the reducing water purification material is used by contacting with wastewater under neutral or alkaline condition.

8. The reducing water purification material according to claim 1, wherein the reducing water purification material is used by contacting with wastewater in a non-oxidizing atmosphere.

* * * * *